HYDRAULIC BOWL RELEASE FOR CONE CRUSHERS

Original Filed Nov. 13, 1961 2 Sheets-Sheet 1

INVENTOR.
LOREN G. SYMONS,

HYDRAULIC BOWL RELEASE FOR CONE CRUSHERS

Original Filed Nov. 13, 1961 2 Sheets-Sheet 2

INVENTOR.
LOREN G. SYMONS,

United States Patent Office

Re. 27,482
Reissued Sept. 19, 1972

27,482
HYDRAULIC BOWL RELEASE FOR CONE CRUSHERS

Loren G. Symons, North Hollywood, Calif., assignor to Rex Chainbelt Inc., Milwaukee, Wis.

Original No. 3,162,387, dated Dec. 22, 1964, Ser. No. 151,708, Nov. 13, 1961, which is a division of Ser. No. 690,458, Oct. 16, 1957, now Patent No. 3,019,994, dated Feb. 6, 1962. Application for reissue Mar. 3, 1971, Ser. No. 120,783
Int. Cl. B02c *7/14*
U.S. Cl. 241—290 17 Claims

Matter enclosed in heavy brackets [ ] appears in the original patent but forms no part of this reissue specification; matter printed in italics indicates the additions made by reissue.

This is a division of my copending application Serial No. 690,458, filed October 16, 1957, now Patent No. 3,019,994, issued February 6, 1962.

The present invention relates to an improvement in cone crusher adjusting and release means, and has for one purpose to provide improved and quickly releasable and yieldable locking means for locking the bowl of a cone crusher against unintended movement in relation to the bowl supporting ring.

Another purpose is to provide means for quickly releasing such locking means and for thereby permitting quick adjustment of the bowl and ring.

Another purpose is to provide improved means for adjusting the bowl of a cone crusher in circumstances where the bowl is in screw-threaded relation to a bowl support by rotating the bowl in relation to the support.

Another purpose is to provide improved releasing means for moving the bowl of a cone crusher when uncrushable material is wedged between bowl and head.

Another purpose is to provide improved control means for controlling the bowl adjusting and bowl releasing means.

Other purposes will appear from time to time in the course of the specification and claims.

I illustrate the invention more or less diagrammatically in the accompanying drawings wherein.

Figure 1:
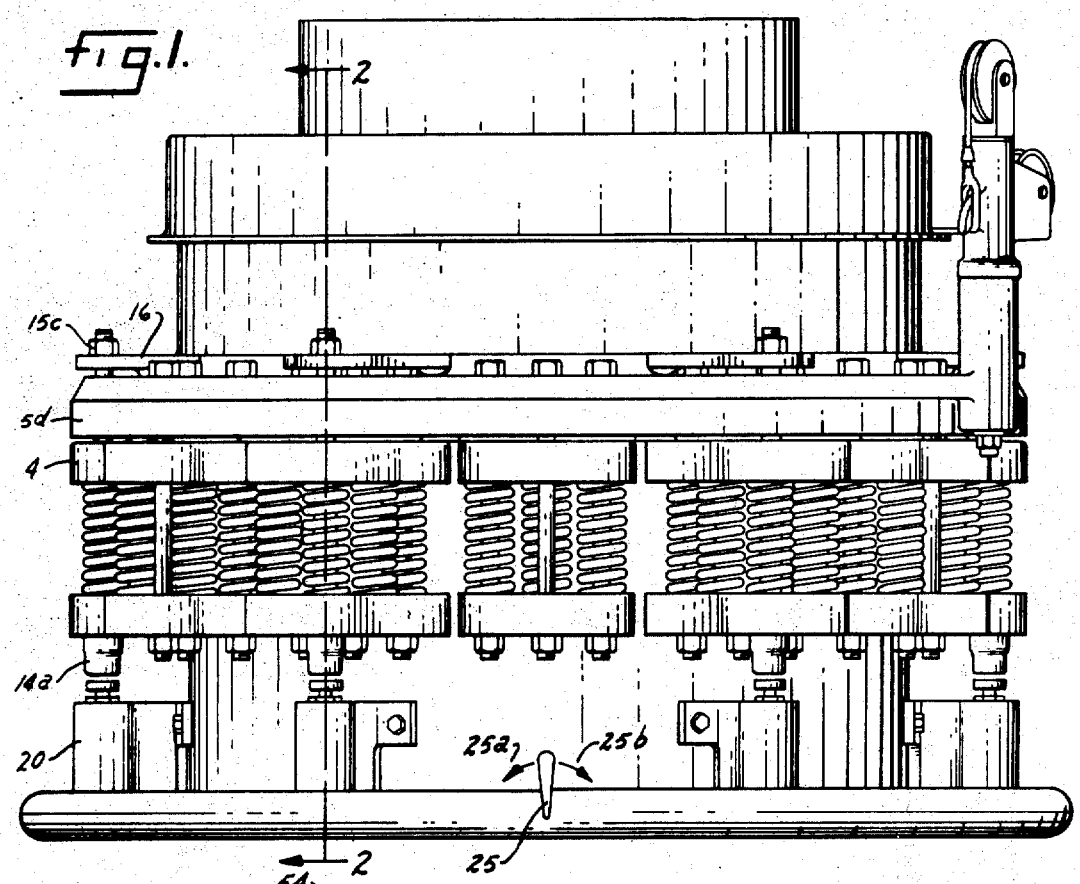
FIGURE 1 is a side elevation of a typical cone crusher.

FIGURE [4] *5* is a more or less diagrammatic illustration of a varying structure.

Like parts are indicated by like symbols throughout the specification and drawings.

Referring to the drawings, 1 generally illustrates the base flange of the circumferential crusher frame 2. The crusher frame terminates at its upper edge in a flange 3 having outwardly extending aprons 4. The flange 3 has an inner, upwardly conic surface 3a and an outer, generally conic surface 3b. Conforming to and centered on and normally in fixed relation to the flange 3 is the bowl ring or support 5. This support has an inner component 5a which is inwardly screw-threaded as at 5b. It extends outwardly and has a circumferential channel, generally indicated at 5c, having portions conforming to the conic faces 3a and 3b of the main frame flange. The ring has also an outward extension or extensions, as at 5d.

In the form of crusher herein shown, the bowl ring 5 is normally held downwardly against the main frame flange 3 by a plurality of springs arranged in clusters. The upper ends of the springs of a particular cluster are positioned within the apron 4 on the flange 3 and abut against the flat lower surface 4a of the main frame flange 3. A lower movable abutment for the spring cluster is indicated at 6. Compressed between the abutment 6 and the lower main frame flange surface 4a are a plurality of springs 7. One spring, indicated at 7a, operates somewhat differently from the remaining springs 7 of the cluster, as will later be seen. Extending through some or all of the springs 7 are spring bolts 8 which may be: headed at the top, as at 8a, and which may have securing nuts or other suitable adjustable abutments 8b at their lower end. By adjustment of the nuts 8b, the compression of the springs 7 may be adjusted. Since the bolts extend through suitable apertures in the main frame flange 3 and in the bowl supporting or adjusting ring 5, with the heads 8a abutting against the top of the bowl supporting or adjusting ring, the springs 7 are effective normally, through the abutment 6 and the bolts 8, to hold the ring 5 firmly downwardly against the main frame flange 3 in the position in which the parts are shown in FIGURE 2.

The bowl structure proper is generally indicated at 10. It includes an outer, outwardly screw-threaded cylindrical portion 10a which is in screw-threaded relation with the portion 5a of the adjusting ring 5. It is shown as having an upwardly and inwardly conic portion 10b which may receive a bowl liner 10d and an upwardly and outwardly conic portion 10c, upon which any suitable hopper or material guide 11 may be positioned. In order to lock the adjusting ring 5 and the bowl 10 against unintended relative rotation, I provide a threaded locking ring 12, shown as having a downwardly extending skirt 12a. To prevent rotation of the locking ring 12 relative to the adjusting ring 5, they may be keyed together, as at 12b. The connection between the threads may be protected in any suitable way, for example, by the outwardly and downwardly extending hood 11a which may wipe across any suitable oil seal 11b on the locking ring 12 and a seal 11c between the locking ring 12 and the adjusting ring 5. In order to lock the locking ring in place, and to prevent undesired relative rotation of the members 5 and 10, I find it advantageous to employ the individual springs 7a. I may, for example, employ one spring in each cluster, or I may employ springs in some clusters while omitting such springs in others, depending upon the required locking pressure.

Figure 2:
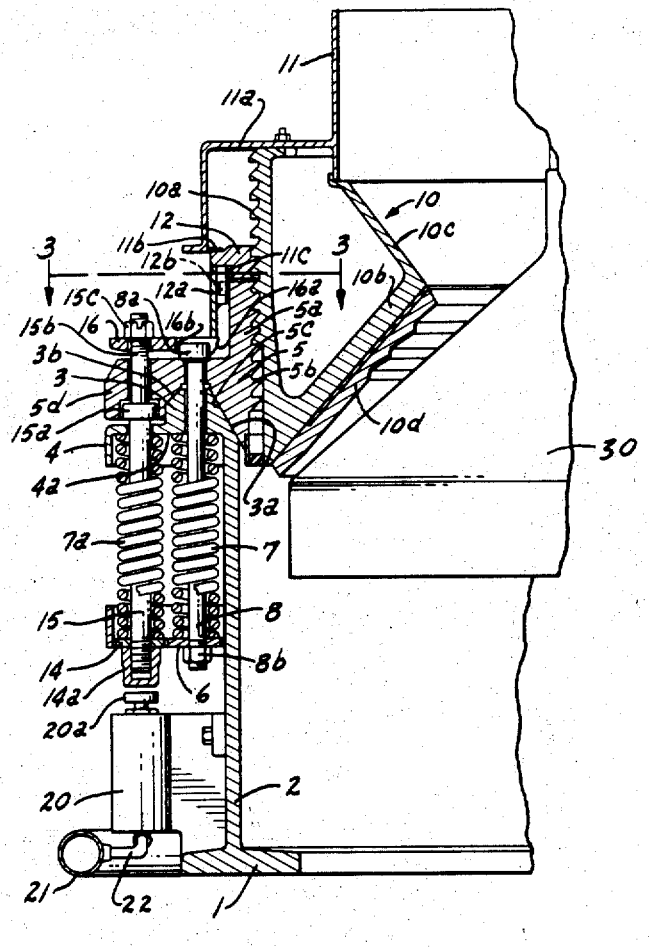
FIGURE 2 is a vertical radial section, on an enlarged scale, on the line 2—2 of FIGURE 1.
Figure 5:
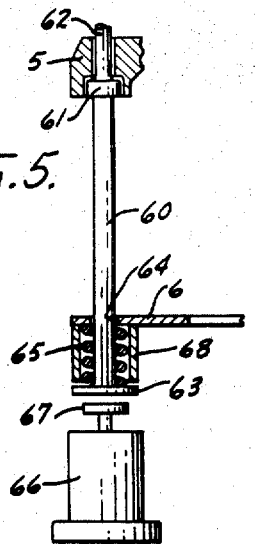
Figure 3:
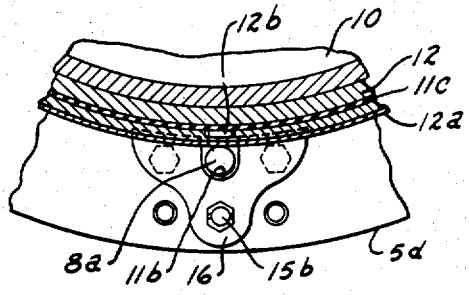
FIGURE 3 is a partial section, with parts broken away, on the line 3—3 of FIGURE 2; [and]

Taking the cluster shown in vertical section in FIGURE 2 as typical, it will be noted that the spring 7a has a separate washer 14 at its lower end and a separate adjustment or adjusting nut 14a. This abutment 6 is apertured or cut away to permit this. The spring bolt 15 of the spring 7a has the washer 14 adjustably secured by the adjusting nut 14a. The bolt 15 is shown as having an enlargement 15a which enters an appropriate cavity in the lower part of the main frame flange portion 5d. The parts are so proportioned at a slight upward travel of the spring bolt 15 is permitted before the enlargement 15a contacts the upper end of the cavity in the portion 5d in which it is positioned. Thus, a slight upward movement of the spring bolt 15 is permitted, without any movement of the adjusting ring 5. I employ this slight upward movement to permit or effect a release of the locking ring 12. The locking ring is normally urged upwardly by locking levers 16, of which the lever shown in FIGURE 2 is typical. These levers may be fulcrumed on heads 16a at or adjacent their inner ends which are notched at 16b to straddle the heads 8a of spring bolts 8. The short end of the lever abuts the bottom of the apron 12a of the locking ring 12. The outer portion of the lever 16 is shown as apertured to permit the passage therethrough on an upward extension 15b of the spring bolt 15. The nut 15c, when the spring 7a and the spring olt 15 are in the position in which they are shown in IGURE 2, operates to exert a downward pressure on ıe outer end of the locking lever 16, which exercises a ɔrresponding upward thrust against the apron 12a of ıe screw-threaded locking ring 12. To increase the ·ngth of the lever, it may be inclined to the radial. It 'ill be understood, of course, that a sufficient number f the spring bolts 15 and their associated springs 7a are ·eed from the normal clusters to exercise an adequate pward locking thrust against the locking ring 12.

When it is desired to adjust the crusher by imparting a ɔtation of the bowl 10 in relation to the adjusting ring 5, provide means for lifting the spring bolts 15 a sufficient istance to free the locking pressure of the locking ring 2. A slight travel is sufficient, and this travel may be btained, for example, by the use of hydraulic jacks, such s are shown at 20 in FIGURE 2. There will preferably e an individual hydraulic jack for each of the spring olts 15, each jack constituting thereby a release for one f the locking levers 16. The details of the jacks do not f themselves form part of the present invention. It will e understood, however, that they may be connected by ny suitable manifold 21 to which the interior of each ıck is connected by any suitable passage 22. I prefer ɔ employ conventional spring return jacks so that when ydraulic pressure is admitted to the interior of the jack, s piston 20a rises, the spring being effective to depress ıe piston 20a when hydraulic pressure is released.

It is thought not necessary to show the hydraulic system ı detil. I illustrate, however, in diagrammatic form, a alve control lever 25 which, when moved in one direc- on or to one position, permits only sufficient pressure to uild up in the jacks to raise the spring bolts 15 a dis- ınce effective merely to release the lever 16. I may, for xample, employ any suitable bypass valving so that the nly possible result of moving the lever 25 in the direction 5a would be to elevate the spring bolts 15 as far as ıey are permitted to rise without lifting the bowl adjust- ıg ring 5. On the other hand, when the lever 25 is moved ı the direction 25b or to a different position, it will be nderstood that the valving is effective to permit sufficient ressure to build up in the jacks to elevate the adjustment ing 5 as high as the springs 7 and 7a will permit it to se. I may say that the possible excursion in a known ype of cone crusher having a cone with a diameter of 7 eet at the lower edge is of the order of 4½ to 5 inches. However, the particular size of the crusher, or the particu- ır permitted excursion, are not critical. What I wish to e able to do, and can do by the herein described struc- ıre, is to employ a set of jacks alternatively to release ıe locking pressure on the locking ring 12, or to elevate ıe bowl adjustment ring 5. A purpose for elevating the ing 5 is to permit the interior of the crusher to be freed f uncrushable material which has stalled the crusher.

It will be understood that in the normal use of the de- ice, the crushing head, generally indicated at 30, is gy- ıted toward and away from the bowl 10. The crushing ıkes place as the result of the gyration of the head within ıe normally fixed bowl. In the event that uncrushable ıaterial, such as a mass of packed particles or a dipper ɔoth, sor some other piece of trap iron, is in the crush- ıg cavity and does not pass through, the crusher may stall. ı such case, with the machine stalled, I may use the jacks 0 to compress the springs 7 as well as 7a, and to thereby levate the adjusting ring 5. The result is to increase the learance between the bowl and head. The blocking ma- ·rial then normally passes downwardly from the crush- ıg cavity. When the tramp iron or dipper teeth are in- olved, and are of too great a size to pass downwardly ırough the cavity, they can easily be lifted upwardly out f the bowl.

Figure 4:
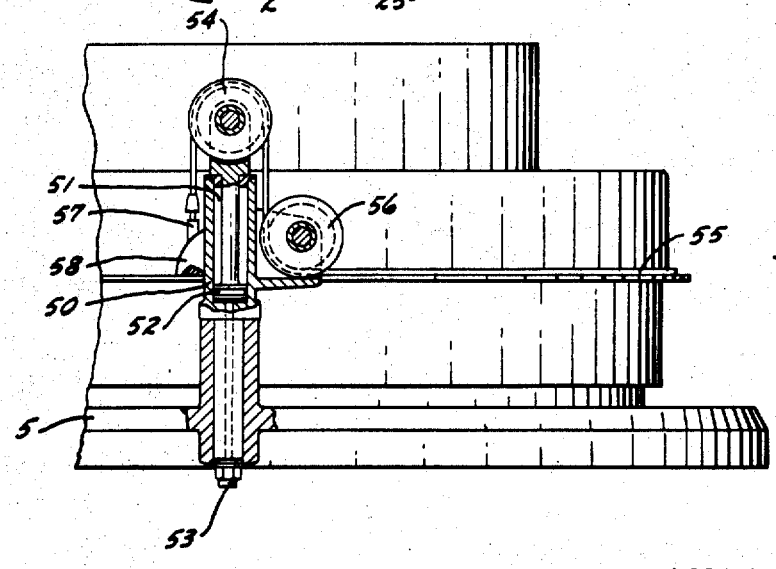
*FIGURE 4 is a side elevation on the same scale as FIGURE 2, with parts broken away and parts in section, illustrating another feature of my invention; and*

*In many crushing operations frequent adjustment is ecessary because of the high degree of wear. I illustrate ı FIGURE 4 a suitable means for applying hydraulic*

*pressure to impart rotation to the bowl 10 in relation to the adjusting ring 5. I illustrate, for example, a post 50 positioned on the adjusting ring 5. I form this post as a jack, with a bore 51 and a piston 52. Oil entering the bore of the cylinder 51 through the oil connection 53 will raise the piston or plunger, and its plunger sheave, upwardly. An adjusting cable or suitable flexible member 55 passes around the sheave 56 on the adjusting ring, and passes upwardly about the sheave 54 and can be hooked by the eye or ring 57 on the hook 58 fixed in relation to the jack. Thus, as the sheave 54 is elevated, the cable 55 is drawn in about the sheave 6 and it is secured at its opposite end to the bowl structure 10. Therefore, the result of the upward movement of the sheave 54 is to rotate the bowl 10 in relation to the adjusting ring 5. This rotation is permitted only when the locking ring 12 has already been moved to the release position by a suitable upward movement of the lower jacks 20. When the ring has thus been released the upper jack structure above described may be operated to pull in on the cable 55 and thus to rotate the bowl structure 10 to its desired adjustment. It will be understood that I may use one or more such jacks. It will also be understood that I may employ the above described system of FIGURE 4 to rotate the bowl 10 in either direction. I may, for example, have a pair of such jacks with sheaves 56 and hooks 58 on opposite sides of each jack. It will be further understood that when a greater movement than that obtained by the possible elevation of the sheave 54 is desired, the cable ring 57 may be released from the hook 58, and may be secured to or by any suitable crane or hoist, whereby a greater rotational excursion may be obtained.*

In the form of the FIGURE [4] *5* I illustrate an alternative application of force. The disclosure can be taken somewhat diagrammatically, with the main frame and top flange omitted, but with a rod element 60 illustrated, which passes upwardly through the bottom of the spring cluster plate or abutment 6, and passes upwardly through the bowl supporting ring 5 to connect with a leverage which may be as shown in FIGURE 2. I am, therefore, illustrating in FIGURE [4] *5* the material which actually differs from the structure shown in FIGURE 2. The rod 60 resembles the spring bolt 15 of FIGURE 2, in that it has a top enlargement 61 fitting into an appropriately formed aperture in the bottom of the bowl supporting ring 5, and also has an upward extension 62 which may engage any siutable leverage for applying force to the locking ring 12, as shown in FIGURE 2. The rod 60 has a bottom plate or abutment 63 which is located substantially below the plate 6. The rod passes through an appropirate aperture 64, centrally located in the plate 6, or so located as to be on the general axis of the combined spring thrust of the cluster of springs taken as a whole. A separate spring 65, located below the cluster plate or abutment 6, is compressed between it and the bottom plate 63 of the rod 60, and normally urges the rod downwardly in such fashion as to deliever, through a suitable leverage, such as is shown in FIGURE 2, a locking upthrust against the locking ring 12 of FIGURE 2. However, when adjustment or release is necessary, hydraulic pressure is admitted to the jack 66 and urges its operating piston 67 upwardly against the bottom plate or abutment 63 of the rod 60. The piston 67 urges the rod and the plate 63 upwardly, and the first contact is with a downwardly extending abutment or abutments 68 below the plate 6. This elevation is sufficient to move the rod 60 upwardly far enough to release the locking ring 12 of FIGURE 2, or its equivalent. The bowl can then be adjusted, *as above described*. If, however, the hydraulic system is operated to give the maximum upward movemen of the jack element 67, then the second contact takes place between the rod enlargement 61 and the bowl supporting ring 5, and the jack system is effective to lift the ring 5 to the extent permitted by the full, or substantially full, compression of the springs 7. FIGURE [4] *5* will, of course be read as if the springs 7 were in position and were compressed between the plate 6 and the main frame flange 16 of FIGURE 2.

The structure of FIGURE [4] *5* has certain definite advantages. For example, the thrust of each jack is balanced with the thrust of the particular nest of springs with which it is associated. It will be understood, of course, that a suitable number of jacks is positioned around the main frame, there being one for each of the selected number of spring nests. In some circumstances, in heavy duty crushers, it may be advantageous to have a jack and a push rod 60 for each nest of springs. Under most circumstances, however, this is not necessary.

It will be realized that whereas I have described and shown a practical and operative device, nevertheless, many changes may be made in size, shape, number and disposition of parts without departing from the spirit of my invention. I, therefore, wish my description and drawings to be taken as in a broad sense illustrative or diagrammatic rather than as limiting me to my specific disclosure herein. It will be understood, for example, that whereas I have illustrated a crusher in which the springs are arranged in clusters, my system may be applied equally well to crushers in which the springs are equally distributed in a single tier about the exterior of the main frame. Whereas I illustrate the jacks 20 as below the main frame flange 3 and, of course, below the adjusting ring 5, they may be put at any other desired or desirable location. Likewise, whereas I find it advantageous to apply the lifting thrust through the spring bolts 15 to the adjusting ring 5, by the use of the heads 15a, I do not wish to be limited to this specific arrangement.

It will be understood, also, that whereas I find it advantageous to have each of the thrust members 15 or 60 operate initially to release the bowl for adjustment, and to operate thereafter by a longer travel to elevate the bowl, I may segregate the system and have some members operating to release for adjustment and other members operating to release the bowl.

The use and operation of the invention are as follows: Stated simply, I employ springs to hold a bowl or bowl support against movement in relation to a main frame. I find it desirable normally to rely on these springs. In currently employed cone crushers, such springs are used, and give adequate service. In cone crushers now on the market, adjustments, however, are somewhat lengthy and difficult, and no means are provided for a quick release of a stalled crusher. My invention provides both quick adjustment in normal use and quick release of the crusher, when stalled, by a hydraulic system which normally idles. It operates only when needed. Normally, the springs operate to hold the adjusting ring 5 downwardly against the main frame flange 3, while permitting the necessary yielding safety release to prevent breakage and to permit occasional overloads to pass through. However, when adjustment is desired the movement of the lever 25 in the direction 25a immediately releases the locking ring 12. This permits rotation of the bowl 10 in relation to the adjustment ring 5. If the head is gyrated in the proper direction, the immediate result of such a release of the locking ring 12 is to permit the bowl to rotate in response to the movement of the head and the material compressed therebetween. *Otherwise, the structure of FIGURE 4 may be used.* As soon as the desired adjustment is reached, the hydraulic jacks 20 are released by a return of the lever 25 to neutral, and the springs 7a resume their normal locking thrust of the lever 16 against the locking ring 12. If desired, additional locking means may be employed, such as any suitable links or connections, not herein shown, between the bowl 10 and the adjusting ring 5. *If desired, the cable 55, which is normally hydraulically operated to impart a limited rotation of the bolt end, may be connected to any other suitable crane or other source of power in order to impart a movement of greater amplitude.*

I claim:

1. In a gyratory crusher, a circumferential main frame with an outwardly extending flange adjacent its upper edge, a bowl supporting ring tiltably mounted on said flange and movable upwardly therefrom, a bowl mounted on the bowl supporting ring, yielding means for normally holding the bowl supporting ring downwardly against said flange and substantially fixed in relation to the main frame while permitting overload release, including a plurality of bowl holding and release springs, their upper ends abutting the lower side of said main frame flange, movable abutments for the lower ends of the springs, and spring bolts passing through apertures in said main frame flange, and connecting said abutments and bowl supporting ring with said springs under compression therebetween, thrust members extending upwardly among the springs through the main frame flange with a surface opposing the bowl supporting ring, and a plurality of hydraulic jacks positioned about the main frame relative to the thrust members so that when the jacks are energized, they apply an upthrust to the thrust members which will be communicated to the bowl supporting ring, thereby raising the bowl to allow the free escape of lodged material.

2. The structure of claim 1 further characterized in that the surface on the thrust members includes an enlargement thereon disposed between the supporting ring and the flange on the main frame.

3. In a gyratory crusher, a circumferential main frame with an outwardly extending flange adjacent its upper edge, an adjustment ring tiltably mounted on said flange and movable upwardly therefrom, a bowl mounted on the adjustment ring, yielding means for normally holding the adjustment ring downwardly against the main frame flange and substantially fixed in relation to the main frame but permitting overload release, a plurality of thrust rods positioned symmetrically around the main frame extending upwardly through the main frame flange, a lateral surface on each of the thrust rods between the main frame flange and the adjustment ring, and a plurality of hydraulic jacks positioned about the main frame relative to the thrust rods so that when the jacks are energized, they will apply an upthrust to the thrust rods which will be communicated to the adjustment ring by the lateral surfaces on the thrust rods to thereby raise the bowl in order to allow the free escape of lodged material.

4. The structure of claim 3 further characterized in that the lateral surface on the thrust members includes an enlargement thereon between the main frame flange and the adjustment ring.

5. In combination, a gyratory cone crusher having a circumferential main frame with an outwardly extending flange adjacent its upper edge, a bowl supporting ring tiltably mounted on said flange and movably upwardly therefrom, a bowl mounted on the bowl supporting ring, yielding means for normally holding the bowl supporting ring downwardly against said flange and substantially fixed in relation to the main frame while permitting overload release, including a plurality of bowl holding and release springs, their upper ends abutting the lower side of said circumferential main frame flange, movable abutments for the lower ends, and spring bolts passing through apertures in said main frame flange and connecting said abutments and the bowl supporting ring with said springs under compression, said bowl being in screw-threaded relation with the bowl supporting ring whereby, when the bowl is rotated in relation to the ring, its elevation is adjusted, a locking ring in screw-threaded relation with the bowl and means for holding it against rotation in relation to the bowl supporting ring, spring means for normally applying an upward thrust to the locking ring to eliminate thread clearance between the bowl and bowl supporting ring and tending to lock the bowl against rotative adjustment, and means for releasing said spring means and or thereby permitting free rotation of the bowl in relation to the bowl supporting ring.

6. A system of bowl adjustment for a cone crusher having a main frame, a bowl supported for adjustment on the main frame, a crushed head mounted for movement in the main frame and defining a crushing cavity with the bowl, spring means for releasably restraining the bowl against unintended adjustment under a predetermined amount of spring pressure, power means operatively associated with the spring means such that operation thereof overcomes and releases the spring means so that adjustment of the bowl may take place, and additional power means for adjusting the bowl relative to the main frame when the releasable spring means is released.

7. A system of bowl adjustment for a cone crusher having a main frame, a bowl supported for adjustment on the main frame, a crushing head mounted for movement in the main frame and defining a crushing cavity with the bowl, spring means for releasably restraining the bowl against unintended adjustment under a predetermined amount of pressure, and power means operatively associated with the spring means such that the operation thereof compresses and releases the spring means so that adjustment of the bowl may take place.

8. The structure of claim 7 further characterized in that the yielding means for releasably restraining the bowl includes a plurality of springs disposed about the crusher, means for maintaining the springs under compression and effective to exert the thrust of the thus compressed springs between the bowl and main frame, and further characterized in that the power means operatively associated with the spring means includes a plurality of hydraulic jacks positioned about the main frame and disposed to apply a compressing thrust to the springs to compress them so that the springs will be overcome and the bowl will be released for adjustment.

9. In a gyratory crusher, a circumferential main frame, a bowl mounted in screw-threaded relationship to the main frame and constructed to be adjusted by rotation thereof, and means for applying a limited, generally axial yielding upthrust to the bowl to releasably restrain it against movement in the main frame but constructed to be released so that free rotative adjustment of the bowl may take place, including a ring in screw-threaded relation with the bowl, means for holding the ring against rotation in relation to the main frame, and a plurality of springs disposed about the main frame, maintained under compression, and effective between the ring and the main frame to thereby apply a releasably upthrust to the bowl through the ring.

10. The structure of claim 9 further characterized by and including power means for overcoming and compressing the springs to thereby permit free rotation of the bowl in the main frame for adjustment thereof.

11. In a gyratory crusher, a circumferential main frame, a bowl supporting ring tiltably mounted at the upper edge of the main frame and movable upwardly therefrom to permit overload release, a bowl screw-threaded in the supporting ring and constructed to be adjusted by rotation thereof, and means for applying a limited, generally axially, yieldable upthrust to the bowl, effective between the bowl and the bowl supporting ring, to releasably restrain the bowl against rotative adjustment in the bowl supporting ring, constructed to be released so that free rotative adjustment of the bowl may take place, including means for applying a yieldable and compressible upthrust to the bowl reactively effective immediately between the bowl and bowl supporting ring to restrain the bowl against rotative adjustment in the bowl supporting ring, and separate means for eliminating the yieldable upthrust so that the bowl may be freely rotated and adjusted.

12. In a hydraulic system of bowl release for a cone crusher having a main frame, a bowl supporting ring on said main frame, a bowl adjustable on said ring, and a spring release normally holding said ring fixed on said main frame, but formed and adapted to permit its movement in relation to the main frame when uncrushable material is present in the crushing cavity, yielding means for normally holding the bowl against unintended movement in relation to the bowl supporting ring, a plurality of hydraulic jacks circumferentially arranged about the crusher, and thrust members mounted about the frame, and aligned with and in position to be contacted by said jacks, means for releasing the yielding means between the bowl and the bowl supporting ring in response to a predetermined minimum excursion of one or more of said thrust members, and means for directing a lifting thrust against the bowl supporting ring in response to a predetermined greater excursion of one or more of said thrust members.

13. In a hydraulic system of bowl release for a cone crusher having a main frame, a bowl adjustably supported on said main frame, means for locking it against unintended adjusting movement, a spring release normally holding said bowl fixed on said main frame but formed and adapted to permit its movement in relation to the main frame when uncrushable material is present in the crushing cavity, a plurality of hydraulic jacks circumferentially arranged about the crusher, means for releasing the locking means between the bowl and frame in response to a predetermined lesser excursion of one or more of said jacks, and means for directing a lifting thrust against the bowl in response to a predetermined greater excursion of one or more of said jacks.

14. In a hydraulic system of bowl release for a cone crusher having a main frame, a bowl supporting ring on said main frame, a bowl adjustable on said ring, and a spring release normally holding said ring fixed on said main frame, but formed and adapted to permit its movement in relation to the main frame when uncrushable material is present in the crushing cavity, yielding means for normally holding the bowl against unintended movement in relation to the bowl supporting ring a plurality of hydraulic jacks circumferentially arranged about the crusher, and thrust members mounted about the frame, and aligned with and in position to be contacted by said jacks, means for releasing the yielding means between the bowl and the bowl supporting ring in response to a predetermined excursion of one of more of said thrust members, and means for lifting the bowl supporting ring from the main frame.

15. In a hydraulic system of bowl release for a cone crusher having a main frame, a bowl adjustably supported on the main frame, a crushing head mounted for movement in the main frame and defining a crushing cavity with the bowl, means for restraining the bowl against unintended adjusting movement, a spring release normally holding the bowl fixed on the main frame constructed to permit it to move in relation to the main frame when uncrushable material is present in the crushing cavity, and separate power means operatively associated with the restraining means, spring release and bowl such that initial operation of the separate power means releases the restraining means so that the bowl may be adjusted and further operation of the separate power means lifts the bowl to clear uncrushable material.

16. A hydraulic system of bowl release for a cone crusher having a main frame, a bowl supported on the main frame for both adjustment and release, a crushing head mounted for movement in the main frame and defining a crushing cavity with the bowl, means for releasably restraining the bowl against unintended adjustment, a spring release normally holding the bowl fixed on the frame under pressure and constructed to permit the bowl to release to a release position in relation to the main frame when uncrushable material is present in the crushing cavity, and power means operatively associated with the releasable restraining means, the spring release and the bowl such that initial operation thereof releases the releasable restraining means so that adjustment of the bowl may take place and further operation moves the bowl to its release position to allow uncrushable material to be cleared from the crushing cavity.

17. A hydraulic system of bowl adjustment and bowl release for a cone crusher having a main frame, a bowl supported on the main frame for both adjustment and release, a crushing head mounted for movement in the main frame and defining a crushing cavity with the bowl, means for releasably restraining the bowl against unintended adjustment, a spring release normally holding the bowl fixed on the frame under pressure and constructed to permit the bowl to release to a release position in relation to the main frame when uncrushable material is present in the crushing cavity, power means operatively associated with the releasable restraining means, the spring release and the bowl such that operation thereof releases the releasable restraining means so that adjustment of the bowl may take place and moves the bowl to its release position to allow uncrushable material to be cleared from the crushing cavity, and additional power means for adjusting the bowl relative to the main frame when the releasable restraining means is released.

References Cited

The following references, cited by the Examiner, are of record in the patented file of this patent or the original patent.

UNITED STATES PATENTS

| | | | |
|---|---|---|---|
| 2,550,098 | 4/1951 | Traylor | 261—209 |
| 2,680,511 | 6/1954 | Bjarme | 241—290 |
| 2,687,257 | 8/1954 | Rumpel | 241—215 |
| 2,747,804 | 5/1956 | Rumpel | 241—286 |
| 2,791,383 | 5/1957 | Kjelgaard | 241—290 |
| 3,019,994 | 2/1962 | Symons | 241—290 |

GRANVILLE Y. CUSTER, Jr., Primary Examiner